(12) United States Patent
Gumpoltsberger

(10) Patent No.: US 7,549,942 B2
(45) Date of Patent: Jun. 23, 2009

(54) MULTI-SPEED TRANSMISSION

(75) Inventor: Gerhard Gumpoltsberger, Friedrichshafen (DE)

(73) Assignee: ZF Friedrichshafen AG, Freidrichshafen (DE)

( * ) Notice: Subject to any disclaimer, the term of this patent is extended or adjusted under 35 U.S.C. 154(b) by 386 days.

(21) Appl. No.: 11/705,111

(22) Filed: Feb. 9, 2007

(65) Prior Publication Data

US 2007/0207891 A1 Sep. 6, 2007

(30) Foreign Application Priority Data

Feb. 14, 2006 (DE) .................. 10 2006 006 637

(51) Int. Cl.
*F16H 3/62* (2006.01)
*F16H 3/44* (2006.01)

(52) U.S. Cl. ...................... 475/280; 475/276

(58) Field of Classification Search ......... 475/275–280, 475/282, 284, 286, 288, 290, 311, 317, 323
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,139,463 A | 10/2000 | Kasuya et al. | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,960,149 B2 * | 11/2005 | Ziemer | 475/276 |
| 7,018,319 B2 | 3/2006 | Ziemer | |

(Continued)

FOREIGN PATENT DOCUMENTS

DE 29 36 969 4/1981

(Continued)

*Primary Examiner*—Tisha D Lewis
(74) *Attorney, Agent, or Firm*—Davis & Bujold, P.L.L.C.

(57) ABSTRACT

The multi-speed transmission with nine forward gears and one reverse gear comprises four planetary gear sets (P1, P2, P3, P4), seven rotatable shafts (1, 2, 3, 4, 5, 6, 7), as well as six control elements (03, 04, 05, 15, 17, 36), wherein the input shaft (1) is connected to the carrier of the planetary gear set (P1) and can be connected via a clutch (15) to the shaft (5), which is connected to the carrier of the third planetary gear set (P3) and can be coupled to the housing (G), wherein the sun gear of the planetary gear set (P1) is connected to the housing (G), the shaft (4) is connected to the ring gear of the planetary gear set (P3) and to the sun gear of the planetary gear set (P4) and can be coupled to the housing (G), wherein the shaft (3) is connected to the ring gear of the planetary gear set (P2) and to the carrier of the planetary gear set (P4) and can be coupled to the housing (G), and the shaft (6) is permanently connected to the ring gear of the planetary gear set (P1) and to the sun gear of the planetary gear set (P3), wherein the shaft (7) is connected to the sun gear of the planetary gear set (P2) and the output shaft (2) is connected to the ring gear of the planetary gear set (P4) and to the carrier of the planetary gear set (P2), wherein a clutch (17) detachably connects the input shaft (1) to the shaft (7) and a clutch (36) detachably connects the shafts (3) and (6) to each other.

21 Claims, 3 Drawing Sheets

U.S. PATENT DOCUMENTS

| | | | |
|---|---|---|---|
| 7,267,630 B2 * | 9/2007 | Tabata et al. | 475/275 |
| 2007/0099741 A1 * | 5/2007 | Klemen | 475/280 |

FOREIGN PATENT DOCUMENTS

| | | |
|---|---|---|
| DE | 199 12 480 | 9/2000 |
| DE | 199 49 507 | 4/2001 |
| DE | 101 15 983 | 10/2002 |
| DE | 101 15 987 | 10/2002 |
| DE | 102 13 820 | 10/2002 |
| EP | 0 434 525 | 6/1991 |

* cited by examiner

|  | 1. | 2. | 3. | 4. | 5. | 6. | 7. | 8. | 9. | R1. |
|---|---|---|---|---|---|---|---|---|---|---|
| i_G: | 4.53 | 2.82 | 2.07 | 1.44 | 1.06 | 0.82 | 0.67 | 0.57 | 0.50 | -3.83 |
| phi: | 8.99 | 1.61 | 1.36 | 1.44 | 1.36 | 1.29 | 1.23 | 1.17 | 1.13 | -0.85 |
| 03 |  |  |  | x |  |  |  | x |  |  |
| 04 | x | x |  |  |  |  |  |  |  | x |
| 05 | x |  | x |  |  |  |  |  | x |  |
| 15 |  |  |  | x |  | x |  |  |  | x |
| 17 |  | x | x | x | x | x |  |  |  |  |
| 36 |  |  |  |  |  |  | x | x | x | x |

US 7,549,942 B2

MULTI-SPEED TRANSMISSION

This application claims priority from German Application Serial No. 10 2006 006 637.5 filed Feb. 14, 2006.

FIELD OF THE INVENTION

The present invention relates to a multi-speed transmission in planetary design, particularly an automatic transmission for a motor vehicle.

BACKGROUND OF THE INVENTION

According to the state of the art, automatic transmissions, particularly for motor vehicles, comprise planetary gear sets, which are shifted using friction elements and/or control elements, such as clutches and brakes, and which are typically connected to a starting element that is subject to a slip effect and optionally provided with a converter lock-up clutch, for example a hydrodynamic torque converter or a fluid clutch.

A transmission of this type is described in EP 0 434 525 A1. It comprises essentially one input shaft and one output shaft, which are disposed parallel to each other, a double planetary gear set concentric with the output shaft, and five control elements in the form of three clutches and two brakes, the selective operation of which, in pairs, determines the different gear ratios between the input shaft and the output shaft. This transmission has a front-mounted gear set and two power paths, so that by the selective engagement, in pairs, of the five control elements, six forward gears are obtained.

In the first power path, two clutches are required for transmitting the torque from the front-mounted gear set to two elements of the double planetary gear set. These elements are provided in the power flow direction substantially behind the front-mounted gear set in the direction of the double planetary gear set. In the second power path, a further clutch is provided, which detachably connects this path with a further element of the double planetary gear set. The clutches are disposed such that the inner disk carrier forms the output end.

Furthermore, from the published prior art document U.S. Pat. No. 6,139,463 a compact multi-speed transmission in planetary design, particularly for a motor vehicle, is known, which has two planetary gear sets and one front-mounted gear set, as well as three clutches and two brakes. In this known multi-speed transmission, two clutches C-1 and C-3 are provided in a first power path for transmitting the torque from the front-mounted gear set to the two planetary gear sets. The outer disk carrier and/or the cylinder or piston and pressure compensation sides of the clutch C-3 are connected with a first brake B-1. Furthermore, the inner disk carrier of the third clutch C-3 is connected to the cylinder and/or piston and pressure compensation sides of the first clutch C-1, the inner disk carrier of the first clutch C-1 being disposed on the output side and connected to a sun gear of the third planetary gear set.

From DE 199 49 507 A1 by the applicant, a multi-speed transmission is also known, according to which on the drive shaft two non-shiftable, front-mounted gear sets are provided, which on the output side generate two rotational speeds which, in addition to the rotational speed of the input shaft, can be switched by selectively engaging the control elements that are used to engage a shiftable double planetary gear set that acts upon the output shaft, such that, for changing from one gear to the next higher or lower gear, only one of the two actuated control elements must be engaged or disengaged.

DE 199 12 480 A1 discloses an automatically shiftable motor vehicle transmission with three carrier-mounted planetary gear sets as well as three brakes and two clutches for switching between six forward gears and one reverse gear, and with one drive shaft and one output shaft. The automatically shiftable motor vehicle transmission is configured the drive shaft is directly connected to the sun gear of the second planetary gear set and the drive shaft can be connected, via the first clutch, to the sun gear of the first planetary gear set and/or, via the second clutch, to the carrier of the first planetary gear set. Additionally or alternatively, the sun gear of the first planetary gear set can be connected, via the first brake, to the transmission housing and/or the carrier of the first planetary gear set can be connected, via the second brake, to the housing and/or the sun gear of the third planetary gear set can be connected, via the third brake, to the housing.

Furthermore, DE 102 13 820 A1 discloses a multi-speed automatic transmission, comprising a first input path T1 of a first speed ratio, an input path T2, which has a larger speed ratio than the input path T1, a planetary gear set with four elements, wherein the four elements are arranged in order, in the direction of power flow, a first element, a second element, a third element and a fourth element following a clutch C-2 that transmits rotation from the input path T2 to the first element S3, a clutch C-1 that transmits rotation from the input path T2 to the fourth element S2, a clutch C-4 that transmits rotation from the input path T1 to the first element, a clutch C-3 that transmits rotation from the input path T1 to the second element C3, a brake B-1 that engages the fourth element, a brake B-2 that engages the second element, and an output member that is coupled with the third element R3.

Within the scope of DE 101 15 983 A1 by the applicant, a multi-speed transmission is described, comprising a drive shaft that is linked with a front-mounted gear set, an output shaft that is connected with a rear-mounted gear set, and a maximum of seven control elements, through the selective shifting of which at least seven forward gears can be shifted without range shifting. The front-mounted gear set is formed by a front-mounted planetary gear set or a maximum of two non-shiftable front-mounted planetary gear sets linked with the first front-mounted planetary gear set, wherein the rear-mounted gear set is configured as a two-carrier four-shaft transmission with two shiftable rear-mounted planetary gear sets and has four free shafts. The first free shaft of this two-carrier four-shaft transmission is connected with the first control element, the second free shaft with the second and third control elements, the third free shaft with the fourth and fifth control elements, and the fourth free shaft is connected with the output shaft. According to the invention, a multi-speed transmission with a total of six control elements is proposed, which connect the third free shaft or the first free shaft of the rear-mounted gear set additionally with a sixth control element. For a multi-speed transmission with a total of seven control elements, it is proposed according to the invention that the third free shaft is additionally connected with a sixth control element D' and the first free shaft additionally with a seventh control element.

Furthermore, the scope of DE 101 15 987 A1 by the applicant describes a multi-speed transmission with at least seven gears. In addition to the input shaft and the output shaft, this transmission comprises a non-shiftable front-mounted gear set and a shiftable rear-mounted gear set in the form of a two-carrier four-shaft transmission. The front-mounted gear set comprises a first planetary gear set, which, in addition to the input rotational speed of the input shaft, also provides a second rotational speed, each of which may optionally be shifted to a rear-mounted gear set. The rear-mounted gear set comprises two shiftable planetary gear sets, which can shift at least seven gears using the six shift elements, forming two power paths. During each shifting operation, range shifting is advantageously avoided. A 9-gear multi-speed transmission is further known from DE 29 36 969 A1; it comprises eight control elements and four gear sets, wherein one gear set serves as a front-mounted gear set, and the main transmission comprises a Simpson gear set and a further gear set serves as a reversing gear mechanism.

Automatic vehicle transmissions in planetary design in general have previously been described in the prior art on many occasions and undergo continuous developments and improvements. These transmissions should have, for example, a sufficient number of forward gears as well as one reverse gear and a gear ratio that is excellently suited for motor vehicles, having a high overall spread as well as favorable progressive ratios. Furthermore, they should allow a high starting gear ratio in the forward direction and should include a direct gear, and should additionally be suited for use both in passenger cars and in commercial vehicles. In addition, these transmissions should have a low complexity, in particular they should require a small number of control elements, and should avoid double-shifts when shifting sequentially, so that always only one control element is engaged when shifting in defined gear groups.

SUMMARY OF THE INVENTION

It is therefore the object of the present invention to propose a multi-speed transmission of the type mentioned above in which the design complexity is simplified and furthermore the efficiency in the main driving gears in terms of drag and gearing losses, is improved. Furthermore, it is intended that low torque act on the control elements and planetary gear sets in the multi-speed transmission according to the invention, and that the rotational speeds of the shafts, control elements and planetary gear sets be kept as low as possible. In addition, the number of gears and the spread of the gear ratios are supposed to be increased, implementing advantageously at least nine forward gears and at least one reverse gear. Furthermore, the transmission according to the invention is supposed to be suitable for any design in a vehicle, particularly for a frontal-transverse configuration. A further object of the invention is to provide a multi-speed transmission that has a particularly compact design.

According to the invention, a multi-speed transmission in planetary design is proposed, which has one input shaft and one output shaft, which are disposed in a housing. Furthermore, at least four planetary gear sets—hereinafter referred to as the first, second, third and fourth planetary gear sets—, at least seven rotatable shafts—hereinafter referred to as the input shaft, output shaft, third, fourth, fifth, sixth and seventh shafts—and at least six control elements, comprising brakes and clutches, are provided; the selective engagement of these components creates different gear ratios between the input shaft and the output shaft so that preferably nine forward gears and one reverse gear can be implemented.

According to the invention, the input shaft is permanently connected to the carrier of the first planetary gear set and can be detachably connected, via a clutch, to the fifth shaft, which is permanently connected to the carrier of the third planetary gear set and can be coupled to the housing, via a brake, wherein the sun gear of the first planetary gear set is non-rotatably connected to the housing.

According to the invention, the fourth shaft is permanently connected to the ring gear of the third planetary gear set and to the sun gear of the fourth planetary gear set, and can be coupled to the housing, via a brake, wherein the third shaft is permanently connected to the ring gear of the second planetary gear set and to the carrier of the fourth planetary gear set, and can be coupled to the housing, via a brake, and wherein the sixth shaft is permanently connected to the ring gear of the first planetary gear set and to the sun gear of the third planetary gear set; the seventh shaft is permanently connected to the sun gear of the second planetary gear set, wherein the output shaft is permanently connected to the ring gear of the fourth planetary gear set and to the carrier of the second planetary gear set. Furthermore, the input shaft can be detachably connected to the seventh shaft, via a clutch, wherein a further clutch detachably connects the third and the sixth shafts to each other.

The configuration of the multi-speed transmission according to the invention produces suitable gear ratios, particularly for passenger cars, as well as a considerable increase of the total spread of ratios of the multi-speed transmission, resulting in improved driving comfort and a significant improvement in fuel economy.

In addition, the multi-speed transmission according to the invention allows a considerable decrease in complexity to be achieved, due to the low number of control elements, preferably three brakes and three clutches. It is advantageously possible with the multi-speed transmission according to the invention to start driving with a hydrodynamic converter, an external starting clutch or other suitable external starting elements. It is also conceivable to allow a starting operation with a starting element that is integrated into the transmission. A control element, which is actuated in the first gear and in the reverse gear, is preferred.

Furthermore, good efficiency in the main driving gears, in terms of drag and gearing losses, can be achieved with the multi-speed transmission according to the invention.

Furthermore, low torque is present in the control elements and in the planetary gear sets of the multi-speed transmission, thus advantageously reducing the wear on the multi-speed transmission. In addition, the low torque makes correspondingly small dimensions possible, allowing reductions in the required installation space and the corresponding expenses. Also, the rotational speeds in the shafts, control elements and planetary gear sets are low.

Furthermore, the transmission according to the invention is designed such that it can be adapted to different drive train configurations both in the power flow direction and in terms of space; for example, it is possible to provide the input and output on the same side of the housing.

BRIEF DESCRIPTION OF THE DRAWINGS

The invention will be explained in more detail hereinafter with reference to the exemplary embodiments in the figures, wherein.

DETAILED DESCRIPTION OF THE INVENTION

Figures 1, 2:
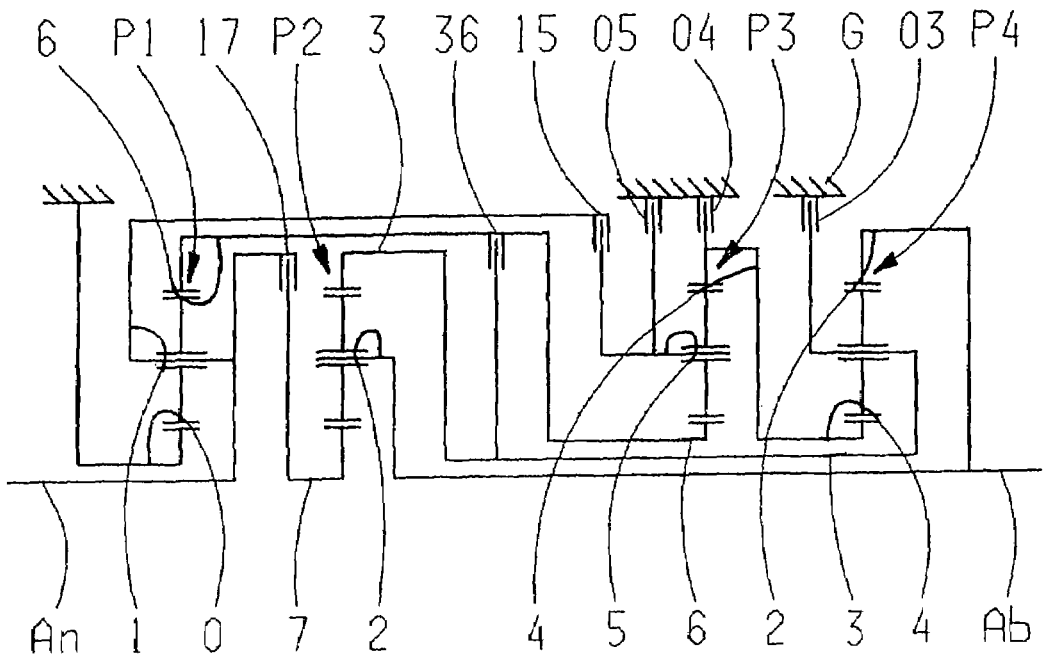
FIG. 1 is a schematic illustration of a preferred embodiment of a multi-speed transmission according to the invention.
FIG. 2 is an exemplary shifting pattern for a multi-speed transmission according to FIG. 1.

FIG. 1 shows a multi-speed transmission according to the invention comprising an input shaft 1 and an output shaft 2, which are disposed in a housing G. Four planetary gear sets P1, P2, P3 and P4 are provided, which are configured as negative planetary gear sets and are preferably arranged one after another in the sequence of P1, P2, P3, P4 in the axial direction and/or in the power flow direction.

As can be seen from FIG. 1, six control elements, namely three brakes 03, 04, 05 and three clutches 15, 17 and 36, are provided. It is preferable if the clutches are configured as multi-disk clutches.

With these control elements, selective engagement of nine forward gears and one reverse gear can be implemented. The multi-speed transmission according to the invention has a total of seven rotatable shafts, namely the shafts 1, 2, 3, 4, 5, 6 and 7.

According to the invention, it is provided in the multi-speed transmission according to FIG. 1 that the input occurs, via the shaft 1, which is permanently connected to the carrier of the first planetary gear set P1 and can be detachably connected, via a clutch 15, to the shaft 5, which is permanently connected to the carrier of the third planetary gear set P3 and can be coupled to the housing G, via a brake 05, wherein the sun gear of the first planetary gear set P1 is non-rotatably connected to the housing (shaft 0).

According to the invention, the shaft 4 is permanently connected to the ring gear of the third planetary gear set P3 and to the sun gear of the fourth planetary gear set P4 and can be coupled to the housing G, via a brake 04. Furthermore, the shaft 3 is permanently connected to the ring gear of the second planetary gear set P2 and to the carrier of the fourth planetary gear set P4, and can be coupled to the housing G, via a brake 03, wherein the shaft 6 is permanently connected to the ring gear of the first planetary gear set P1 and to the sun gear of the third planetary gear set P3, and the shaft 7 is permanently connected to the sun gear of the second planetary gear set P2. The output is achieved, via the shaft 2, which is permanently connected to the ring gear of the fourth planetary gear set P4 and to the carrier of the second planetary gear set, wherein a clutch 17 detachably connects the input shaft 1 to the shaft 7 and a clutch 36 detachably connects the shafts 3 and 6 to each other.

The spatial configuration of the control elements is optional and is limited only by the dimensions and the outer shape.

FIG. 2 shows a shifting pattern of a multi-speed transmission according to FIG. 1 by way of example. For each gear, two control elements are engaged. The shifting pattern shows the respective gear ratios i of the individual gear steps and the resulting progressive ratios phi by way of example. FIG. 2 also shows that double-shifts and/or range shifts are avoided when shifting sequentially because two adjoining gear steps jointly use one control element.

The first gear is defined by the engagement of brakes 04 and 05, the second gear by the engagement of brake 04 and the clutch 17, the third gear is defined by the engagement of clutch 17 and the brake 05, and the fourth gear is defined by the engagement of clutch 17 and the brake 03. Furthermore, the fifth gear is defined by the engagement of clutches 15 and 17, the sixth gear by the engagement of clutch 17 and the clutch 36, the seventh gear by the engagement of clutch 15 and the clutch 36, the eighth gear by the engagement of brake 03 and the clutch 36, and the ninth gear by the engagement of brake 05 and the clutch 36. As the shifting pattern shows, the reverse gear is defined by the engagement of brake 04 and the clutch 15.

According to the invention, initiating drive is possible with an integrated control element (IAK). Here, a control element that is required in both the first gear and the reverse gear without reversal of direction of rotation, for example the brake 04, is particularly suited.

According to the invention, depending on the shifting logic, different gear steps may be obtained from the same gear pattern, allowing application- and/or vehicle-specific variations.

Figure 8:
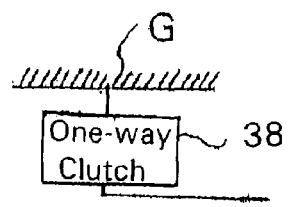
FIG. 8 is a diagrammatic view of an embodiment of the inventive multi-speed transmission having a one-way clutch.

In addition, as shown in FIG. 8, it is possible to provide additional one-way clutches 38 in suitable locations of the multi-speed transmission, for example between a shaft and the housing, or to optionally connect two shafts.

Figure 3:
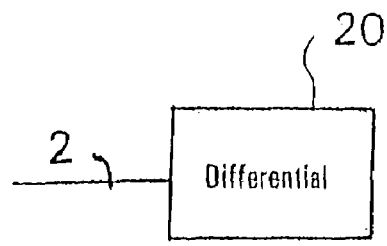
FIG. 3 is a diagrammatic view of an embodiment of the inventive multi-speed transmission having a differential.

On the input side or on the output side, an axle differential 20 and/or a transfer case may be provided according to the invention and shown in FIG. 3.

Figure 4:
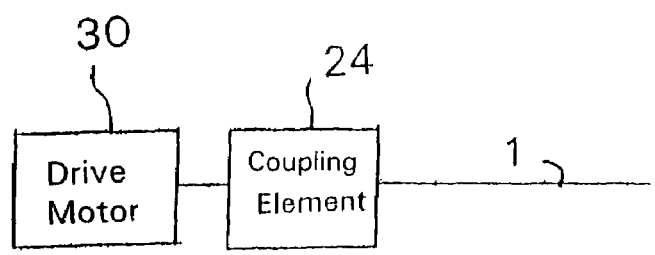
FIG. 4 is a diagrammatic view of an embodiment of the inventive multi-speed transmission with a coupling element and a drive motor.
Figure 5:
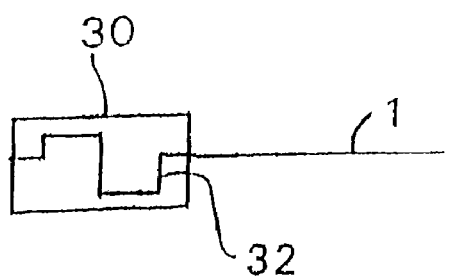
FIG. 5 is a diagrammatic view of an embodiment of the inventive multi-speed transmission with a crankshaft of the drive motor fixed to an input shaft of the multi-speed transmission.
Figure 12:
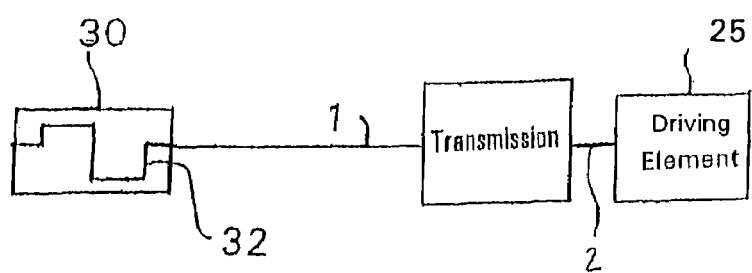
FIG. 12 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development as shown in FIG. 4, the input shaft 1 may be separated from a drive motor 30 as needed by a coupling element 24, wherein the coupling element may be a hydrodynamic converter, a hydraulic clutch, a dry starting clutch, a wet starting clutch, a magnetic powder clutch or a centrifugal clutch. It is also possible, as shown in FIG. 12, to provide such a driving element 25 in the power flow direction behind the transmission, wherein in this case the input shaft 1 is permanently connected to the crankshaft 32 of the drive motor 30 and shown in FIG. 5.

Figure 6:
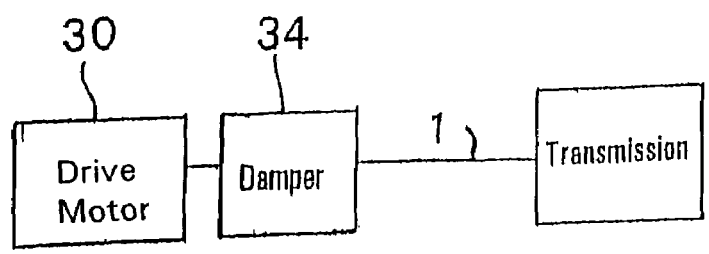
FIG. 6 is a diagrammatic view of an embodiment of the inventive multi-speed transmission having the drive motor communicating with a damper.

The multi-speed transmission according to the invention, and shown in FIG. 6, also permits the torsional vibration damper 34 to be provided between the drive motor 30 and the transmission.

Figure 7:
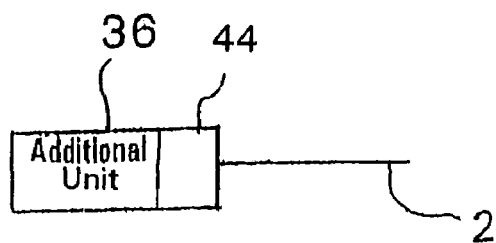
FIG. 7 is a diagrammatic view of an embodiment of the inventive multi-speed transmission with a power take-off for driving an additional unit.
Figure 10:
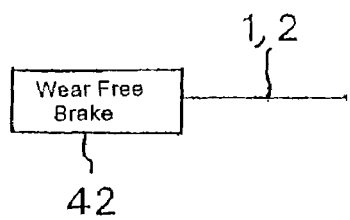
FIG. 10 is a diagrammatic view of a preferred design of the inventive multi-speed transmission having a wear free brake.
Figure 11:
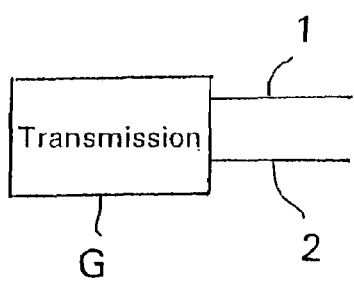
FIG. 11 is a diagrammatic view of a further embodiment of the invention with the input and the output being provided on the same side of the multi-speed transmission housing.

Within the scope of a further embodiment of the invention, shown in FIG. 10, a wear-free brake 42, such as a hydraulic or electric retarder or the like, may be provided on the input shaft 1 or the output shaft 2, which is particularly important when the transmission is used in commercial vehicles. Furthermore, as shown in FIG. 7, a power take-off 44 may be provided on each shaft, preferably on the input shaft 1 or the output shaft 2, to drive additional units 36. Additionally, as shown in FIG. 11, the input and output are provided on the same side of the housing G.

The control elements that are used may be configured as power-shift clutches or power-shift brakes. In particular, friction-locking clutches or friction-locking brakes such as multi-disk clutches, band brakes and/or cone clutches may be used. Furthermore, it is also possible to use positive brakes and/or positive clutches, such as synchronization devices or claw clutches, as the control elements.

Figure 9:
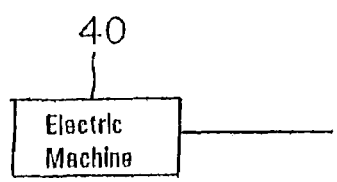
FIG. 9 is a diagrammatic view of an embodiment of the inventive multi-speed transmission with an electric machine.

A further advantage of the multi-speed transmission presented here in FIG. 9, is that an electric machine 40 can be provided on each shaft as a generator and/or as an additional drive unit.

Of course, any design configuration, particularly any spatial configuration of the planetary gear sets and the control elements as such, as well as in relation to each other, falls under the scope of protection of the present claims, to the extent they are technically expedient, without influencing the function of the transmission as described in the claims, even if these embodiments are not explicitly illustrated in the figures or mentioned in the description.

REFERENCE SYMBOLS

1 Shaft
2 Shaft
3 Shaft
4 Shaft
5 Shaft
6 Shaft
7 Shaft
03 Brake
04 Brake
05 Brake
15 Clutch
17 Clutch
36 Clutch
P1 Planetary gear set
P2 Planetary gear set
P3 Planetary gear set
P4 Planetary gear set
i Gear ratio
phi Progressive ratio
G Housing

The invention claimed is:

1. A multi-speed automatic transmission of a planetary design for a motor vehicle, the transmission comprising:
    an input shaft (1) and an output shaft (2) arranged in a housing (G);
    first, second, third and fourth planetary gear sets (P1, P2, P3, P4), and each of the first, the second, the third and the fourth planetary gear sets (P1, P2, P3, P4) comprising a sun gear, a carrier and a ring gear;
    at least third, fourth, fifth, sixth and seventh rotatable shafts (1, 2, 3, 4, 5, 6, 7), as well as at least six control elements (03, 04, 05, 15, 17, 36), comprising first, second, and third brakes (03, 04, 05) and first, second, and third clutches (15, 17, 36), whose selective engagement creates different gear ratios between the input shaft (1) and the output shaft (2) so that at least nine forward gears and a reverse gear can be implemented;
    wherein the input shaft (1) is permanently connected to the carrier of the first planetary gear set (P1) and detachably connectable, via the first clutch (15), to the fifth shaft (5) and, via the second clutch (17), to the seventh shaft (7);
    the output shaft (2) is permanently connected to the ring gear of the fourth planetary gear set (P4) and the carrier of the second planetary gear set (P2);
    the third shaft (3) is permanently connected to the ring gear of the second planetary gear set (P2) and the carrier of the fourth planetary gear set (P4) and detachably connectable, via the first brake (03), to the housing (G);
    the fourth shaft (4) is permanently connected to the ring gear of the third planetary gear set (P3) and the sun gear of the fourth planetary gear set (P4) and detachably connectable, via the second brake (04), to the housing (G);
    the fifth shaft (5) is permanently connected to the carrier of the third planetary gear set (P3) and detachably connectable, via the third brake (05), to the housing (G);
    the sixth shaft (6) is permanently connected to the ring gear of the first planetary gear set (P1) and the sun gear of the third planetary gear set (P3) and detachably connectable, via the third clutch (36), to the third shaft (3);
    the seventh shaft (7) is permanently connected to the sun gear of the second planetary gear set (P2); and
    the sun gear of the first planetary gear set (P1) is fixed to the housing (G).

2. The multi-speed transmission according to claim 1, wherein the first planetary gear set (P1), the second planetary gear set (P2), the third planetary gear set (P3) and the fourth planetary gear set (P4) are arranged in an axial direction in the sequential order of:
    the first planetary gear set (P1), the second planetary gear set (P2), the third planetary gear set (P3) and the fourth planetary gear set (P4).

3. The multi-speed transmission according to claim 1, wherein the first planetary gear set (P1), the second planetary gear set (P2), the third planetary gear set (P3) and the fourth planetary gear set (P4) are negative planetary gear sets.

4. The multi-speed transmission according to claim 1, wherein first gear results from engagement of the second brake (04) and the third brake (05), second gear results from engagement of the second brake (04) and the second clutch (17), third gear results from engagement of the second clutch (17) and the third brake (05), fourth gear results from engagement of the second clutch (17) and the first brake (03), fifth gear results from engagement of the first clutch (15) and the second clutch (17), sixth gear results from engagement of the second clutch (17) and the third clutch (36), seventh gear results from engagement of the first clutch (15) and the third clutch (36), eighth gear results from engagement of the first brake (03) and the third clutch (36), and ninth gear results from engagement of the third brake (05) and the third clutch (36).

5. The multi-speed transmission according to claim 1, wherein the reverse gear results from engagement of the second brake (04) and the first clutch (15).

6. The multi-speed transmission according to claim 1, wherein at least one one-way clutch is located within the transmission.

7. The multi-speed transmission according to claim 6, wherein the at least one one-way clutch is located between the input shaft (1), the output shaft (2), the third shaft (3), the fourth shaft (4), the fifth shaft (5), the sixth shaft (6) and the seventh shaft (7) and the housing (G).

8. The multi-speed transmission according to claim 1, wherein an input and an output of the transmission are located on a common side of the housing (C).

9. The multi-speed transmission according to claim 1, wherein at least one of an axle differential and a transfer case differential is located on one of the input shaft (1) and the output shaft (2).

10. The multi-speed transmission according to claim 1, wherein a coupling element facilitates separation of the input shaft (1) from a drive motor.

11. The multi-speed transmission according to claim 10, wherein the coupling element is one of a hydrodynamic converter, a hydraulic clutch, a dry starting clutch, a wet starting clutch, a magnetic powder clutch or a centrifugal clutch.

12. The multi-speed transmission according to claim 1, wherein an external driving element is located downstream of the transmission, in a direction of power flow, and the input shaft (1) is firmly connected to a crankshaft of a drive motor.

13. The multi-speed transmission according to claim 1, wherein the vehicle is started via one of the at least six control elements (03, 04, 05, 15, 17, 36) of the transmission, and the input shaft (1) is permanently connected to a crankshaft of a drive motor.

14. The multi-speed transmission according to claim 1, wherein a torsional vibration damper is located between a drive motor and the transmission.

15. The multi-speed transmission according to claim 1, wherein a wear-free brake is arranged on at least one of the input shaft (1), the output shaft (2), the third shaft (3), the fourth shaft (4), the fifth shaft (5), the sixth shaft (6) and the seventh shaft (7).

16. The multi-speed transmission according to claim 1, wherein a power take-off is arranged on at least one of the input shaft (1), the output shaft (2), the third shaft (3), the fourth shaft (4), the fifth shaft (5), the sixth shaft (6) and the seventh shaft (7) for driving an additional unit.

17. The multi-speed transmission according to claim 16, wherein the additional unit is arranged on one of the input shaft (1) and the output shaft (2).

18. The multi-speed transmission according to claim 1, wherein the six control elements are one of power-shift clutches and power-shift brakes.

19. The multi-speed transmission according to claim 18, wherein the six control elements are one of multi-disk clutches, band brakes and cone clutches.

20. The multi-speed transmission according to claim 1, wherein the six control elements are one of positive clutches and positive brakes.

21. The multi-speed transmission according to claim 1, wherein an electric machine is arranged on at least one of the input shaft (1), the output shaft (2), the third shaft (3), the fourth shaft (4), the fifth shaft (5), the sixth shaft (6), and the seventh shaft (7) as one of a generator and an additional drive unit.

* * * * *